US006189053B1

United States Patent
Yasue et al.

(10) Patent No.: US 6,189,053 B1
(45) Date of Patent: *Feb. 13, 2001

(54) COMMUNICATION CONTROL SYSTEM UTILIZING A SHARED BUFFER MANAGED BY HIGH AND LOW LEVEL PROTOCOLS

(75) Inventors: Toshikazu Yasue, Chigasaki; Hidemitsu Higuchi, Yokohama; Yukio Shimamoto, Chigasaki; Toru Horimoto, Atsugi, all of (JP)

(73) Assignee: Hitachi, Ltd, Tokyo (JP)

( * ) Notice: Under 35 U.S.C. 154(b), the term of this patent shall be extended for 0 days.

This patent is subject to a terminal disclaimer.

(21) Appl. No.: 09/093,396

(22) Filed: Jun. 9, 1998

Related U.S. Application Data

(63) Continuation of application No. 08/667,336, filed on Jun. 20, 1996, now Pat. No. 5,797,041, which is a continuation of application No. 08/079,872, filed on Jun. 23, 1993, now abandoned.

(30) Foreign Application Priority Data

Jun. 30, 1992 (JP) .................................................. 4-172325
Aug. 31, 1992 (JP) .................................................. 4-230915

(51) Int. Cl.[7] ...................................................... G06F 13/00
(52) U.S. Cl. ............................... 710/52; 710/30; 709/250
(58) Field of Search ............................... 710/128, 20, 21, 710/22, 23, 24, 30, 52; 709/212, 250

(56) References Cited

U.S. PATENT DOCUMENTS

| 4,727,538 | 2/1988 | Furchtgott et al. | 370/85.1 |
|---|---|---|---|
| 5,299,313 | 3/1994 | Petersen et al. | 395/250 |
| 5,797,041 | * 8/1998 | Yasue et al. | 710/52 |

OTHER PUBLICATIONS

Kitamura, et al., "Performance Evaluation for High Speed Protocol Processing at Work Station", C&C Systems Research Laboratories, NEC Corporation, date unknown.

Clark, et al., "An Analysis of TCP Processing Overhead", IEEE Communications, pp. 23–29, Jun. 1989.

Kanakia, et al., "The VMP Network Adapter Board (NAB): High–Performance Network Communication for Multiprocessor", ACM, 1988, pp. 175–187.

IBM Technical Disclosure Bulletin, "Asynchronous/Queued I/O Processor Architecture", vol. 36, No. 1, Jan. 1993, pp. 265–279.*

IBM Technical Disclosure Bulletin, Method to Provide Direct Memory Access by Processor Device Drivers to Coprocessor Effective Address Space, vol. 29, No. 4, Sep. 1986, pp. 1597.*

* cited by examiner

*Primary Examiner*—Richard L. Ellis
(74) *Attorney, Agent, or Firm*—Antonelli, Terry, Stout&Kraus, LLP

(57) ABSTRACT

A communication control system and a method of implementing a high-speed data transmitting and receiving process uses a communication protocol program, a protocol buffer which is managed by the communication protocol program, a communication controller for controlling a transmission line and a network buffer managed by the communication controller. Further, there is provided a shared-buffer which is shared by the protocol buffer and a communication buffer. Frame data from a transmission line is shared by the shared-buffer, so that the frame data is directly written to and read from the shared-buffer by means of a shared-buffer control. Since the buffer is shared between the transmission line and the protocol, no excessive movement of data is required, thereby improving the throughput of the communication system as a whole.

11 Claims, 15 Drawing Sheets

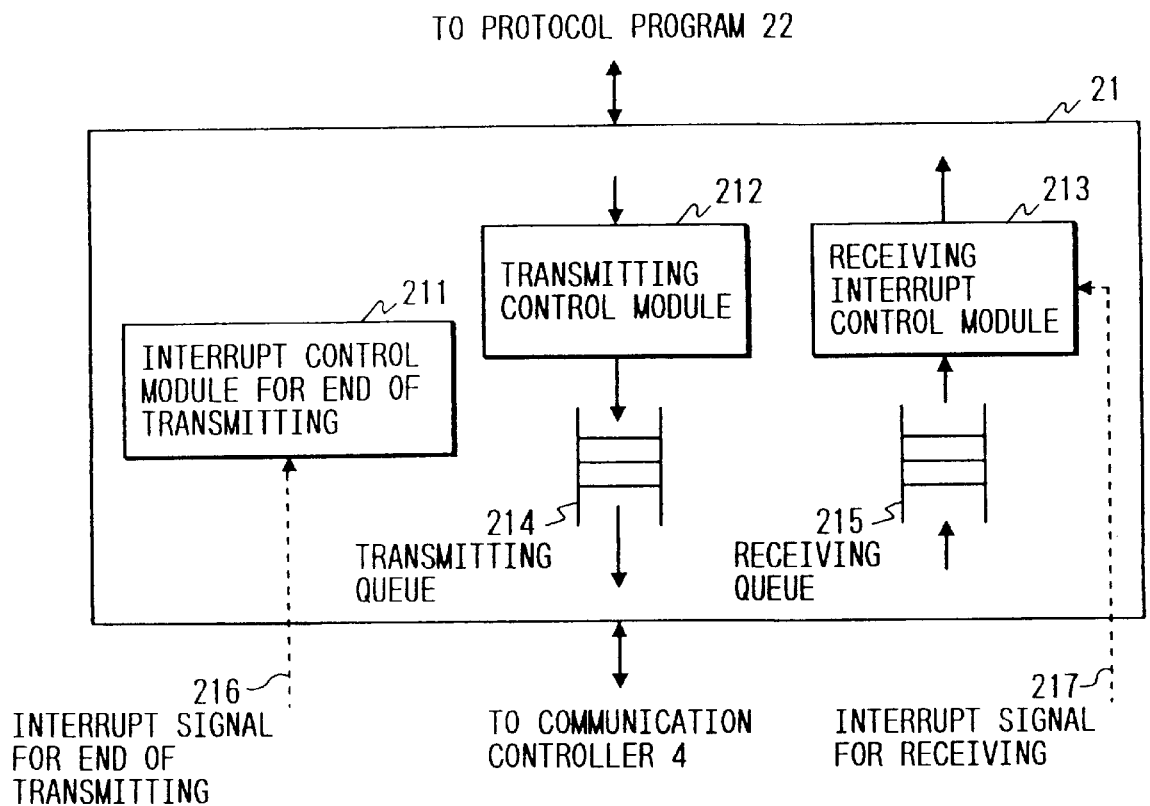
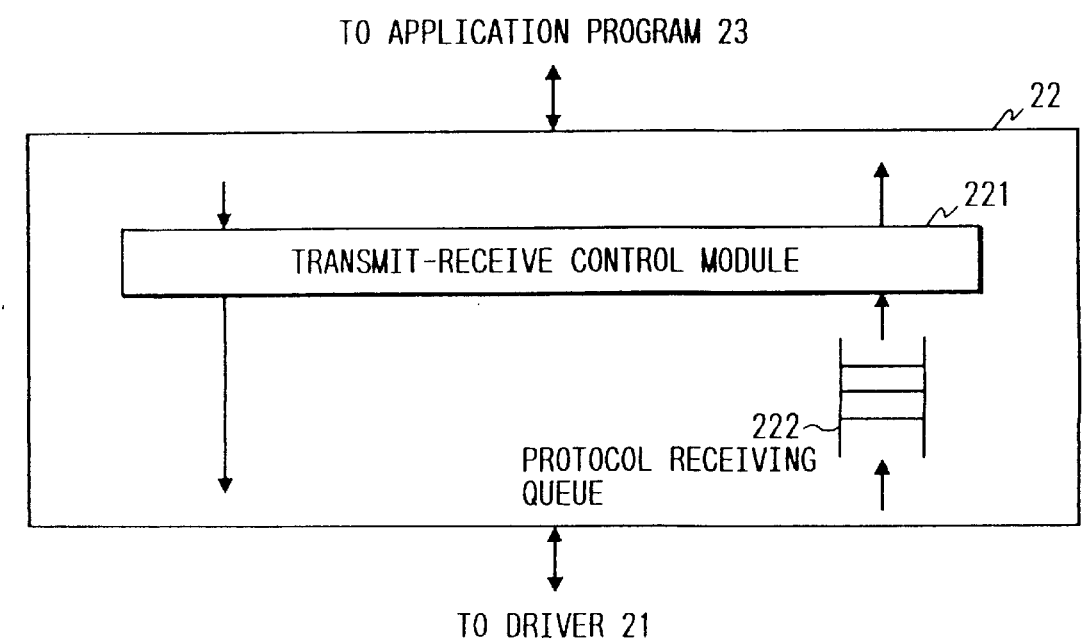

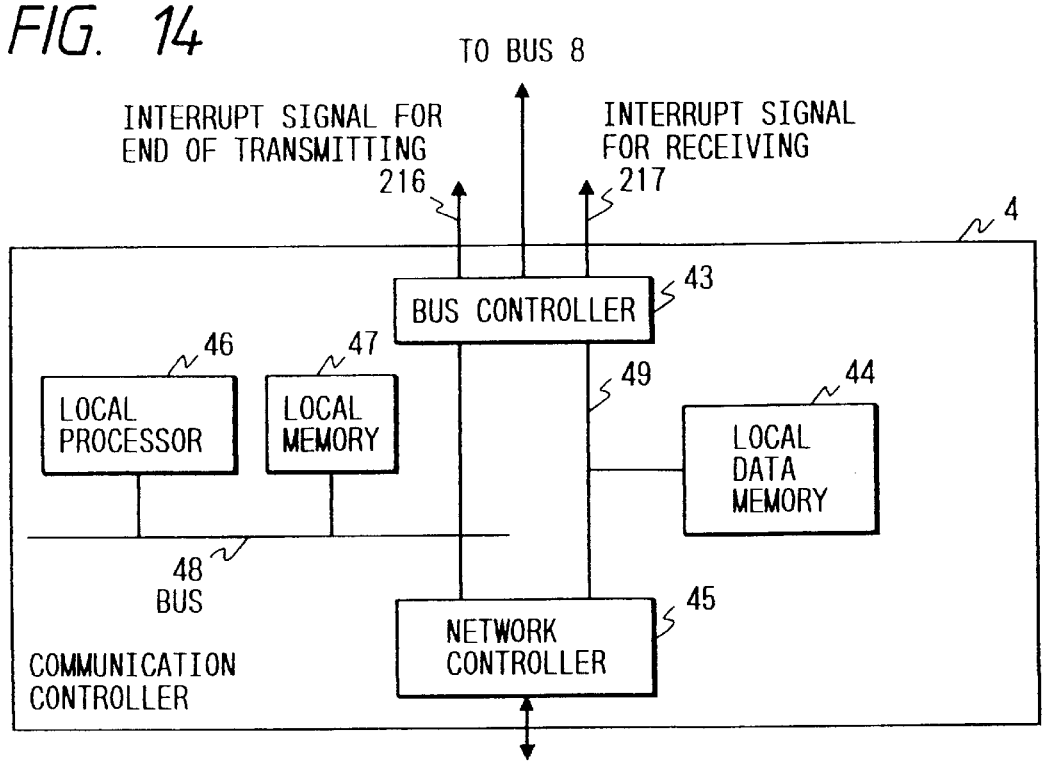
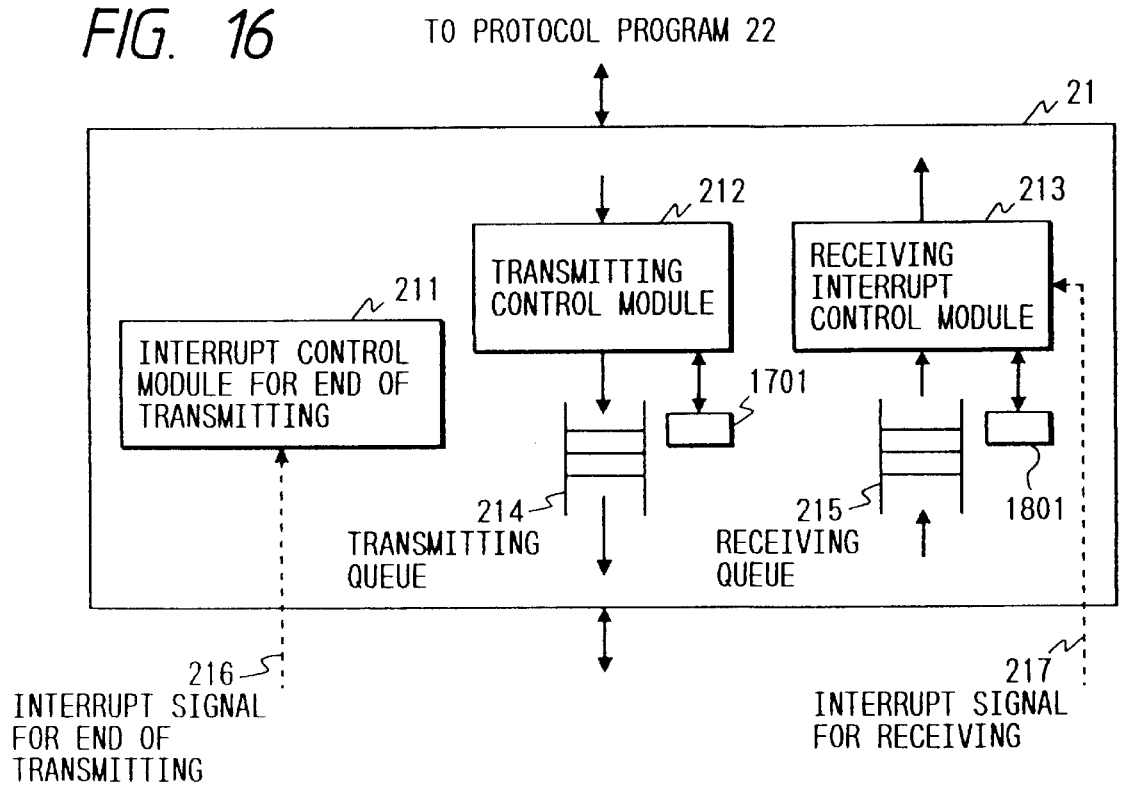

| | CHAIN FLAG | | ADDRESS TO PROTOCOL BUFFER (VIRTUAL ADDRESS) | DATA ADDRESS IN PROTOCOL BUFFER (VIRTUAL ADDRESS) | DATA ADDRESS IN PROTOCOL BUFFER (REAL ADDRESS) |
|---|---|---|---|---|---|
| | ST | EN | | | |
| TD00 | 1 | 0 | TB00 | TxD00 | R-TxD00 |
| TD01 | 0 | 1 | TB01 | TPG0 | R-TPG0 |
| TD10 | 1 | 1 | TB10 | TxD10 | R-TxD10 |
| ⋮ | ⋮ | ⋮ | ⋮ | ⋮ | ⋮ |

| | CHAIN FLAG | | ADDRESS TO PROTOCOL BUFFER (VIRTUAL ADDRESS) | DATA ADDRESS IN PROTOCOL BUFFER (VIRTUAL ADDRESS) | DATA ADDRESS IN PROTOCOL BUFFER (REAL ADDRESS) |
|---|---|---|---|---|---|
| | ST | EN | | | |
| RD10 | 1 | 1 | RB00 | RBG0 | R-RBG0 |
| RD20 | 1 | 1 | RB10 | RBG1 | R-RBG1 |
| RD30 | 1 | 1 | RB20 | RBG2 | R-RBG2 |
| ⋮ | ⋮ | ⋮ | ⋮ | ⋮ | ⋮ |

| DESTINATION ADDRESS | DESTINATION PORT NUMBER | SOURCE ADDRESS | SOURCE PORT NUMBER | AP IDENTIFIER | DRIVER IDENTIFIER |
|---|---|---|---|---|---|
|  |  |  |  |  |  |
| ⋮ | ⋮ | ⋮ | ⋮ | ⋮ | ⋮ |

COMMUNICATION CONTROL SYSTEM UTILIZING A SHARED BUFFER MANAGED BY HIGH AND LOW LEVEL PROTOCOLS

This application is a continuation of application Ser. No. 08/667,336, filed on Jun. 20, 1996 now U.S. Pat. No. 5,797,041; which is a continuation of application Ser. No. 08/079,872, filed on Jun. 23, 1993, now abandoned.

BACKGROUND OF THE INVENTION

The present invention relates generally to high-speed communication control systems, and more particularly to a communication control system which is suitable for use in a local area network (LAN) and a method of controlling the same.

Heretofore, communication controllers for connecting high-speed transmission lines, such as a LAN to personal computers and workstations have been classified into intelligent and nonintelligent types based on differences in their structure.

The intelligent type communication controller includes a bus controller for connecting the communication controller to a bus to which a system processor and a memory are connected, a network controller for transmitting and receiving frame data while directly controlling the transmission line, a local processor operating in accordance with a low hierarchical protocol, and a local memory for storing communication data. The communication controller performs processes relative to, for example, an OSI reference model in a second or lower layer as occasion demands and leaves what is in the third layer or higher to the system processor. The transmission line and the system memory are connected via the communication controller and a bus. The frame data is stored first in the local memory within the communication controller before being copied by the system processor into the system memory. In the case of a high-speed LAN having a transmission capacity as great as 100 Mbps with a FDDI (Fiber Distributed Data Interface), for example, the concentrated load which is applied to the bus can therefore be lightened in comparison with the nonintelligent type of communication controller designed to directly transfer such frame data via the bus to the system memory; consequently, resultant underrun and overrun errors can be prevented. Japanese Patent Laid-Open No. 32650/1990, for example, discloses an arrangement as noted above.

The nonintelligent type communication controller, which has no local processor, includes a network controller for transmitting and receiving frame data while directly controlling the transmission line, and a local memory for storing communication data. The network controller performs processes relative to, for example, the OSI reference models in the first layer (physical layer) and 1.5 layer (media access control) in real time in harmony with the transmission speed of the transmission line. The data frame is stored by the network controller first into the local memory before being copied by the system processor into the system memory. Consequently, the nonintelligent type of communication controller exhibits superior performance when compared with the intelligent type to the extent that the low hierarchical layer is processed by the local processor and is made less costly since the local processor is not included therein. This communication controller has been referred to in, for example, "Performance Evaluation for High Speed Protocol Processing At Workstation" 1992. B-433, Kitamura et al, Collection of Papers at Autumn Meeting of Japan Electronic Data Communication Society, and "An Analysis of TCP Processing Overhead," June, 1989, David D. Clark et al, IEEE Communication Magazine.

Notwithstanding, the need for a data copy operation between the system and local memories degrades the performance efficiency in the prior art and data transfer by means of the system processor also imposes a heavier load on the communication controller.

There also arises another problem which occurs even when the communication controller is used instead of the system processor to copy data from the local memory into the system memory. When, for example, the buffer dealt with by the communication controller differs in format from what is dealt with by the protocol program, it is necessary to shift the data to accommodate this difference. Taking signal reception as an example, the communication controller transfers data to the buffer provided in the system memory, the data being formatted by the communication controller itself, and then the data is shifted to the buffer dealt with by the protocol program. The buffer dealt with by the communication controller is what is specifically used for communication controller hardware in which a predetermined size is assigned to a fixed address, whereas the buffer dealt with by the protocol program is such that a memory is effectively utilized by connecting a plurality of small size areas, for example, by means of a chain and varying the number of areas in accordance with a frame length. Consequently, it takes time to effect the buffer-to-buffer transfer of data, thus lowering the performance to a significant extent.

These problems still exist in multi-protocol processing systems for processing a plurality of communication protocols and multi-network control systems for supporting a plurality of networks.

SUMMARY OF THE INVENTION

An object of the present invention is to provide a high-speed communication control system for making possible direct data transfer between communication hardware for controlling a transmission line and software for processing a communication protocol, and a method of controlling the same.

In order to accomplish the above object, a communication control system according to the present invention is provided with a protocol program for use in processing a communication protocol, a protocol buffer which is managed by the protocol program, a communication controller for transmitting and receiving data while controlling a transmission line, and a communication buffer which is managed by the communication controller. Further, a system memory is provided with a shared buffer having the functions of the protocol and communication buffers in common so that frame data from the transmission line may be transmitted and received without making useless copies between the communication protocol and the communication controller.

Therefore, no excessive movement of data is required as the functions of the protocol and communication buffers are to be commonly used and high-speed data communication can thus be implemented.

Another feature of the present invention lies in the fact that the shared buffer is provided with a plurality of areas, whereby it is made possible to transmit and receive frames of data continuously and to divide one frame of data into a plurality of data parts for storage.

The communication controller employed in one embodiment of the present invention is of the nonintelligent type having only a network controller for directly controlling the transmission line and a bus controller for controlling a bus. In this case, frame data is directly transferred from the transmission line to a shared buffer of the system memory without buffering it on its way, so that the frame data may be transferred directly from the transmission line to the communication protocol and vice versa.

Such a communication controller may also be of the intelligent type having a local processor and a local memory in addition to a network controller for directly controlling the transmission line and the bus controller for controlling the bus.

The intelligent type communication controller operates first to hold the frame data received from the transmission line in the local memory in the communication controller and then to transfer it to the shared buffer of the system memory. Therefore, unlike the nonintelligent type of communication controller, the concentrated load applied to the bus can be lightened and resulting underrun and overrun errors can thus be prevented. Moreover, the frame data can be transferred directly from the communication controller to the communication protocol and vice versa.

The present invention also features the structure of the shared buffer, including a data buffer for storing data, a protocol buffer descriptor for use when the communication protocol program is executed to manage the data buffer and a communication buffer descriptor for use when the communication controller is used to manage the data buffer, whereby the protocol and communication buffer descriptors may be used in a queue structure.

The present invention further features the addition of a means for selecting a protocol to the shared buffer so as to make a plurality of communication protocols processible, whereby the frame data may directly be transferred from the transmission line to the plurality of communication protocols and vice versa.

The present invention still further features the provision of a plurality of transmission lines and shared buffers and the addition of a means for selecting the transmission line for the communication protocol program so as to make transmission data transferable to the corresponding transmission line.

With the aforesaid means, the frame data may be transferred directly from the communication protocol to the plurality of transmission lines and vice versa.

The present invention still further features the utilization of means for selecting the transmission line in a manner that allows the communication protocol program to receive, process or manipulate frame data received from the transmission line, and to send out that data to another transmission line without the buffer-to-buffer movement of the data.

With the aforesaid means, the frame data may be passed through the transmission lines one after another without a useless buffer-to-buffer movement of data. A high-speed bridge, router and a gateway can thus be materialized.

The present invention still further features a processor having two processing units A, B operating asynchronously and independently, wherein a shared buffer to be commonly used for two buffers, the one managed by the processing unit A and the other by the processing unit 8, is provided therebetween, so that high-speed data communication is made possible without making useless copies of data in both processing units.

In the processor above, a buffer is commonly used for two independent processing units and high-speed data communication is made possible as no excessive movement of data is required.

As set forth above, excessive buffer-to-buffer movement of data can be dispensed with as the buffer is shared between the transmission line and the protocol or between the two processing units. Therefore, the present invention has the effect of not only improving the throughput of the total communication system, but also decreasing the load of the system processor.

BRIEF DESCRIPTION OF THE DRAWINGS

FIG. 5 is a block diagram illustrating the internal structure of a driver according to the present invention.

FIG. 6 is a schematic diagram illustrating the internal structure of a protocol program according to the present invention.

FIG. 14 is a block diagram illustrating the internal structure of an intelligent communication controller according to the present invention.

FIG. 16 is a block diagram illustrating the internal structure of another driver in accordance with the present invention.

FIG. 17 is a conversion table of communication protocol buffers for transmitting data by the driver shown in FIG. 16.

FIG. 18 is a conversion table of communication protocol buffers for receiving data by the driver shown in FIG. 16.

DETAILED DESCRIPTION

Referring to the block diagrams and the flowcharts of FIG. 1 through FIG. 15, an embodiment of the present invention will be described.

Figure 1:
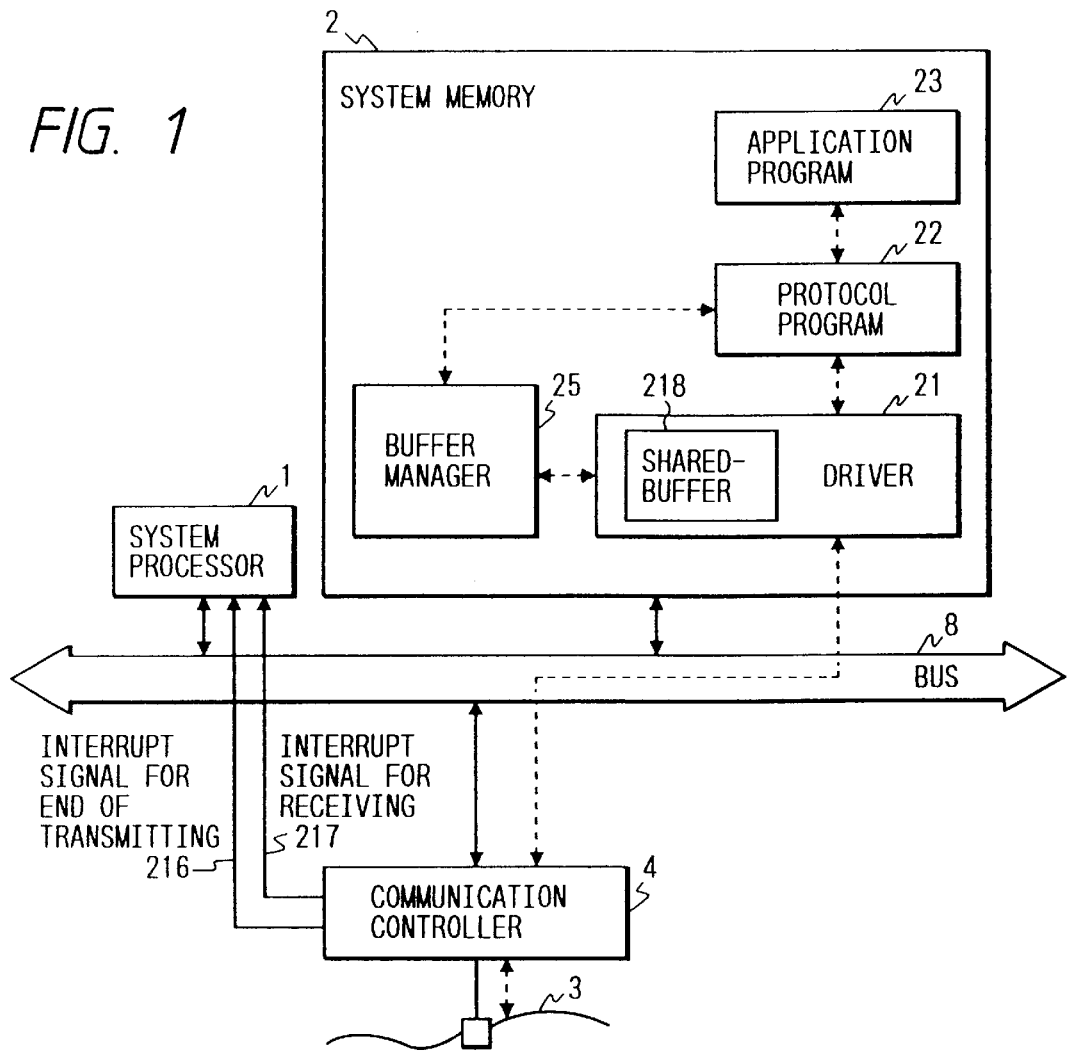
FIG. 1 is a block diagram of a communication control system in a first embodiment of the present invention.

FIG. 1 is an example of a communication control system embodying the present invention. The communication control system comprises a system processor 1 for executing a communication protocol, a system memory 2 and a communication controller 4 for transmitting and receiving data while controlling a transmission line 3. A bus 8 which connects these component elements is used for the exchange of information, such as control codes and communication data. With this arrangement, the system processor 1 and the system memory 2 are used to communication according to a communication protocol, process data according to an application program and to control the communication control system as a whole. The system memory 2 is also utilized to store various program codes to be operated on by the system processor 1 and communication data. With respect to programs, there are, as shown in FIG. 1, a driver 21 for controlling the communication controller, a protocol program 22 and an application program 23 for processing the communication protocol, and a buffer manager 25 for managing a protocol buffer to be used by the driver 21 and the protocol program 22. As will be described in detail later, the driver 21 is provided with a shared buffer 218. In addition, there are provided an operating system and the like; however, a description thereof will be omitted as such features are not directly related to the invention.

A description will be given of the internal structure of the communication controller 4 of FIG. 1 and the data receiving operation thereof, when the controller is of the nonintelligent type.

Figure 12:
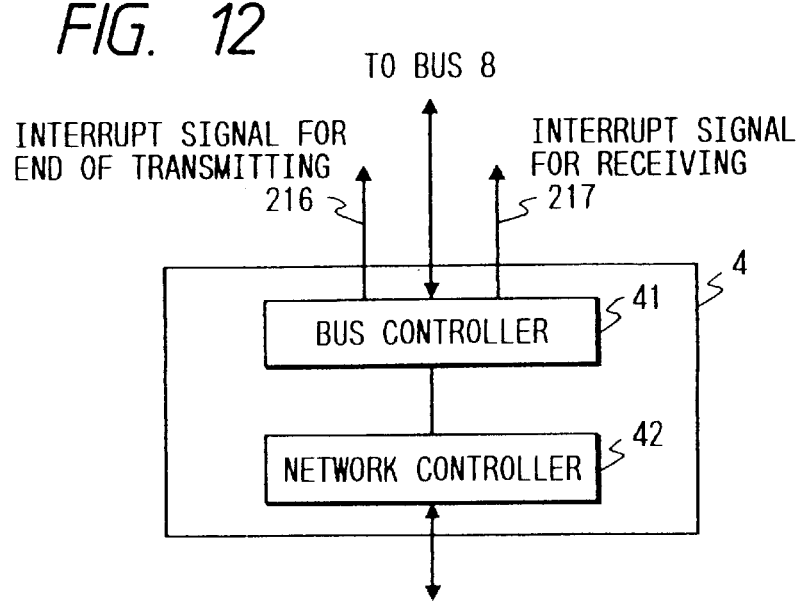
FIG. 12 is a block diagram illustrating the internal structure of a nonintelligent communication controller according to the present invention.

FIG. 12 illustrates the internal structure of the nonintelligent type communication controller 4. While directly controlling the transmission line 3, a network controller 42 transmits and receives data. A bus controller 41 is used to connect the network controller 42 to the bus 8 shown in FIG. 1. Supposing, for example, that the Am79C900 of the AMD Co. is employed, the bus controller 41 reads the data stored in the system memory 2 via the bus 8 under instructions from the network controller 42 at the time of transmitting. At the time of receiving, data from the transmission line 3 is received by the network controller 42, which then instructs the bus controller 41 to transfer the data via the bus 8 to the system memory 2. After the end of the transmit-receive operation, the network controller 42 notifies the system processor 1 of the end of the operation via the bus controller 41 by means of an interrupt signal 216 for end of transmitting and an interrupt signal 217 for receiving.

Figure 13:
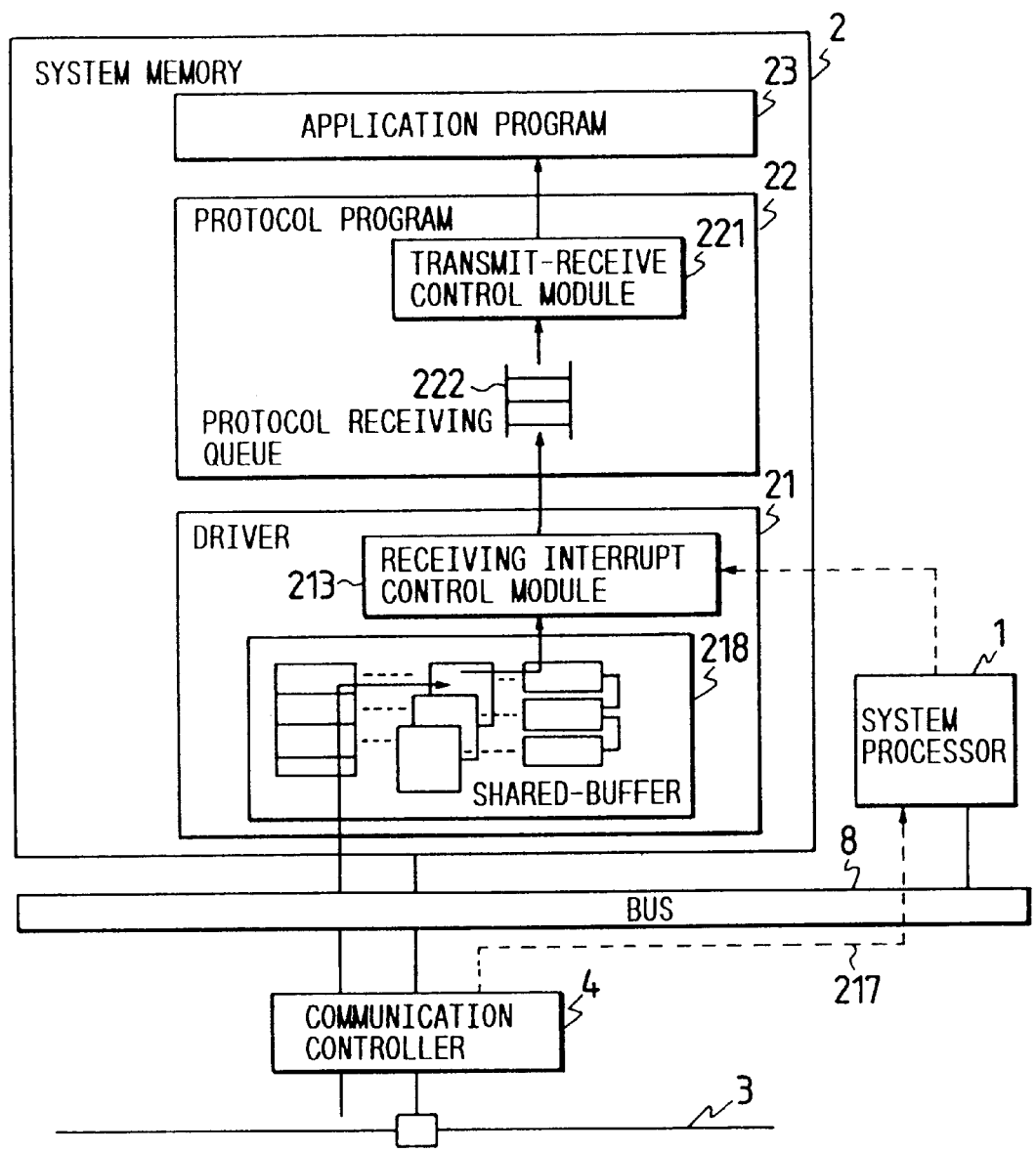
FIG. 13 is an exemplary diagram illustrating the operation of receiving a data frame using the nonintelligent communication controller of FIG. 12.

FIG. 13 illustrates the operation of receiving data using a nonintelligent type communication controller. The driver 21 has a shared-buffer 218 shared between the protocol program 22 and the communication controller 4, and a receiving interrupt control module 213, whereas the protocol program 22 has a protocol receiving queue 222 and a transmit-receive control module 221. The receiving operation will briefly be described. Initially, there is allocated in the shared-buffer 218 a buffer area representing a free space for receiving data. When data is received from the transmission line 3, the communication controller 4 makes use of the successive DMA (Direct Memory Access) function to write via the bus 8 the received data into the allocated buffer the shared-buffer 218 in the system memory 2. When data reception is completed, the communication controller 4 outputs an interrupt signal on line 217 for receiving so as to notify the system processor 1 of the data reception, whereby the system processor 1 starts the receiving interrupt control module 213 of the driver 21. The receiving interrupt control module 213 takes the-buffer area containing the received data out of the shared-buffer 218, connects the buffer area thus taken out to the protocol receiving queue 222 and starts the transmit-receive control module 221 of the protocol program 22. The transmit-receive control module 221 takes the received data out of the protocol receiving queue 222 and after performing the communication protocol process, delivers only application data to the application program 23. In order to actually connect the shared-buffer 218 to the protocol receiving queue 222, a pointer indicating the head position of the buffer area of the shared-buffer 218 is set to the protocol receiving queue 222. In other words, it does not mean that the received data is transferred.

A description will be given of the internal structure of the communication controller 4 of FIG. 1 and the schematic data receiving operation when the controller is of the intelligent type.

FIG. 14 illustrates the internal structure of the intelligent type communication controller 4. The communication controller 4 comprises a network controller 45 for transmitting and receiving data while directly controlling the transmission line 3, a bus controller 43 for connecting the communication controller 4 to the bus 8, a local data memory 44 for storing frame data, a local processor 46 for operating in accordance with a low hierarchical communication protocol and for controlling the communication controller 4 as a whole, and a local memory 47, whereas a bus 48 is used for connecting the local processor 46, the local memory 47, the bus controller 43 and the network controller 45. A bus 49 is used for connecting the local data memory 44, the bus controller 43 and the network controller 45, these buses being used for the exchange of information among the elements. When data is transmitted, the bus controller 43 reads the data stored in the system memory 2 of FIG. 1 via the bus 8 under instructions from the local processor 46 and initially stores the data thus read in the local data memory 44. The local processor 46 adds a network header to the data as occasion demands and assembles the header and data into frame data. Then, the network controller 45 sends out the frame data to the transmission line 3 under instructions from the local processor 46. When data is received, on the other hand, the processing order is reversed. First, the network controller 45 writes the frame data from the transmission line 3 into the local data memory 44 under instructions from the local processor 46 and the local processor 46 removes the network header when necessary. Then the bus controller 43 transfers the data via the bus 8 to the system memory 2 under instructions from the local processor 46. After the transmit-receive operation is completed, the local processor 46 notifies the system processor 1 of the end of the operation via the bus controller 43 by means of the interrupt signal 216 for end of transmitting and the interrupt signal 217 for receiving.

Figure 15:
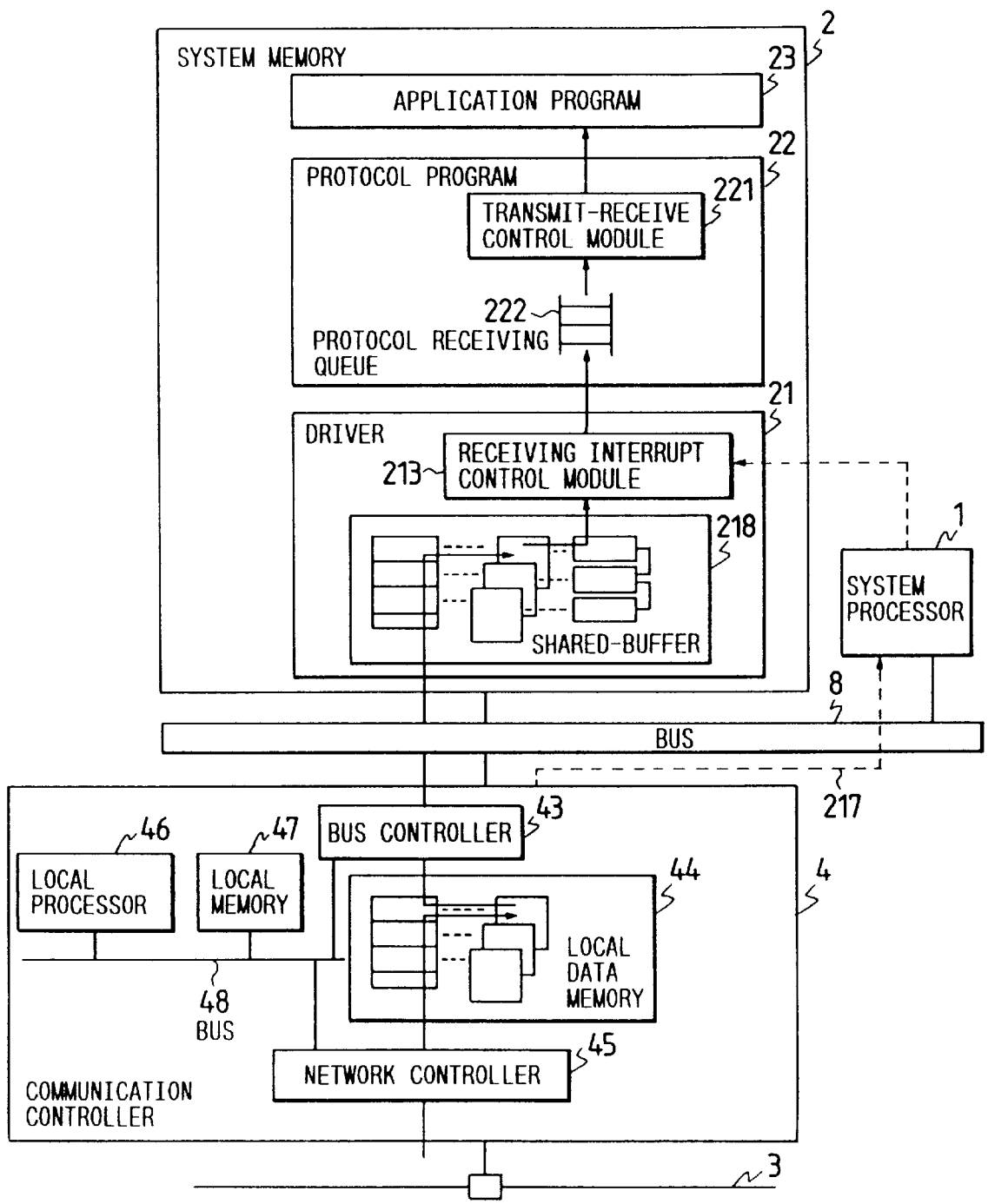
FIG. 15 is an exemplary diagram illustrating the operation of receiving a data frame using the intelligent communication controller of FIG. 14.

FIG. 15 illustrates the operation of receiving data using the intelligent type communication controller 4. The driver 21 and the protocol program 22 are similar to those shown in FIG. 13, and like reference characters are given to like component elements therein. The receiving operation will be described briefly. First, empty buffers for receiving data are allocated in the local data memory 44 and the shared-buffer 218, respectively. When data is sent from the transmission line 3, the network controller 45 successively writes the received data into the local data memory 44. When the receiving operation is terminated, the local processor 46 removes the network header from the received data and instructs the bus controller 43 to transfer the remainder to the shared-buffer 218 in the system memory 2.

When the data has been transferred, the local processor 46 notifies the system processor 1 of the reception of data via the bus controller 43 by means of the interrupt signal 217 for receiving. Then, the system processor 1 starts the receiving interrupt control module 213 of the driver 21. The receiving interrupt control module 213 connects the buffer area loaded with the received data in the shared-buffer 218 to the protocol receiving queue 222 and starts the transmit-receive control module 221 of the protocol program 22. The transmit-receive control module 221 takes the received data out of the protocol receiving queue 222, performs the communication protocol process and then delivers only application data therein to the application program 23. In order to actually connect the allocated buffer area of the shared-buffer 218 to the protocol receiving queue 222, the pointer indicating the head position of the buffer area of the shared buffer 218 is set to the protocol receiving queue 222. However, this does not mean that the received data is transferred at that time.

In FIGS. 13 and 15, the shared-buffer 218 may be so arranged as to have a plurality of areas. In this case, it will be unnecessary to allocate a free area whenever frame data is transmitted or received if the frame data is stored on an area basis. Frame data can thus be transmitted and received continuously without committing an error due to buffer insufficiency.

The protocol header and the application data may also be stored in the respective buffer areas, so that one frame is accommodated by connecting the buffer areas. Hence, the protocol header is readily added and removed by the protocol program 22.

Moreover, the shared-buffer 218 is provided with a data buffer for storing data, a protocol buffer descriptor for use when the protocol program 22 manages the data buffer and a communication buffer descriptor for use when the communication controller 4 manages the data buffer, the protocol and communication buffer descriptors having a queue structure. The exchange of communication data between the protocol program 22 and the communication controller 4 is thus facilitated.

The driver 21 will be described in detail. As illustrated in FIGS. 13 and 15, the driver 21 may function in either the nonintelligent or intelligent types, irrespective of the kind of communication controller 4 being employed.

FIG. 5 illustrates the internal structure of the driver 21. The driver 21 is provided with a program using an interrupt control module 211 for end of transmitting, a transmitting control module 212 and the receiving interrupt control module 213, and a transmitting queue 214 and a receiving queue 215 for linking communication data in a queue. The interrupt control module 211 for end of transmitting and the receiving interrupt control module 213 are started by the interrupt signal 216 for end of transmitting and the interrupt signal 217 for receiving from the communication controller 4 shown in FIG. 1, whereas the transmitting control module 212 is started by the protocol program 22. The transmitting and receiving queues 214, 215 are formed by linking together the buffers shared between the program in the driver 21 and the communication controller 4. In other words, the transmitting and receiving queues 214, 215 are time buffers for linking the protocol which can afford delay in processing and the transmission line 3 operating in asynchronous real time. Referring to the flowcharts (FIGS. 11, 10 and 9), the interrupt control module for end of transmitting 211, the operations of the transmitting control module 212 and the receiving interrupt control module 213 will be described in detail later.

Figure 7:
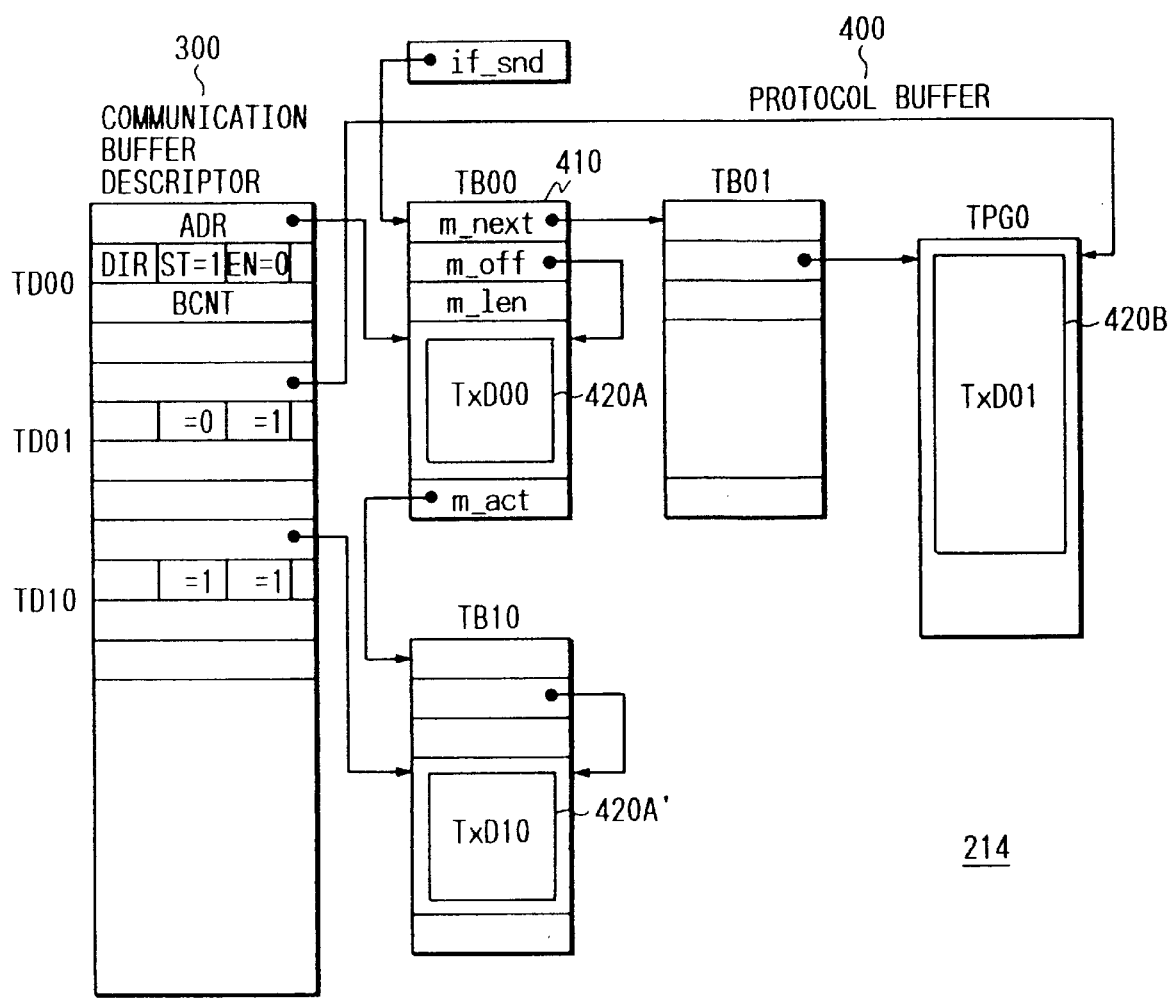
FIG. 7 is a schematic diagram illustrating the internal structure of a transmitting queue according to the present invention.
Figure 8:
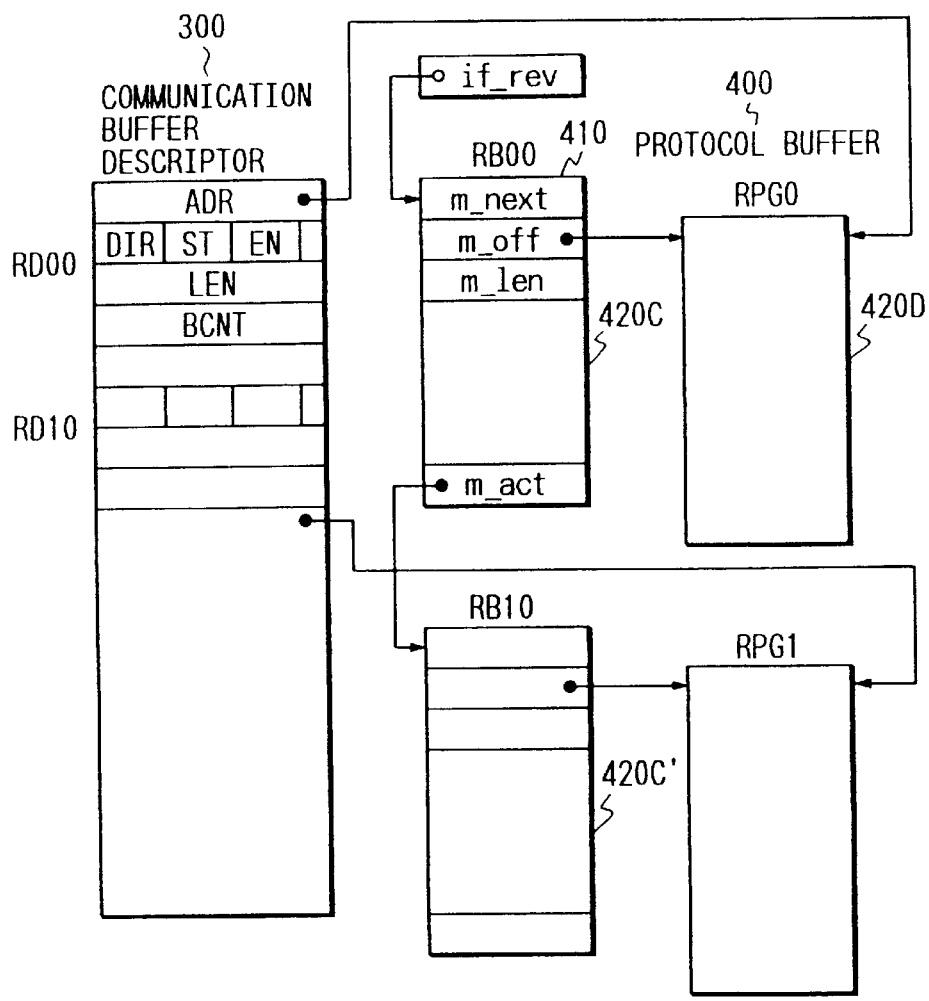
FIG. 8 is a schematic diagram illustrating the internal structure of a receiving queue according to the present invention.

FIGS. 7 and 8 illustrate the detailed structure of the transmitting and receiving queues 214, 215 of FIG. 5. The two queues are formed with a communication buffer descriptor 300 and a protocol buffer 400, respectively. The protocol buffer 400 is so structured as to integrally incorporate a buffer descriptor 410 and a data buffer 420 (420A, 420A', 420B, 420C, 420C', 420D) for storing data. The data buffer is provided with a plurality of storage areas. The communication buffer descriptor 300 is used to store information necessary for the communication controller 4 to gain access to the data buffer 420. On the other hand, the protocol buffer 400 is managed by the buffer manager 25 shown in FIG. 1, and it is the buffer dealt with by the driver 21 and the protocol program 22.

First, the transmitting queue 214 of FIG. 7 will be described. In the example of FIG. 7, there are two frames of data to be transmitted. The first frame includes data with a chain of (TxD00+D01) and is stored in the data buffers 420A, 420B. The second frame is a single data item with (TxD10) and is stored in the data buffer 420A'.

The protocol buffer in the transmitting queue 214, as shown in FIG. 7, is so arranged that its pointer (if–snd) indicates the position of a head buffer TB00. The pointer (if–snd) comes to 0, provided no buffer exists. Buffers TB00, TB01, T010 have, for example, a 112-byte data storage area and various pieces of buffer managing information, 128 bytes in total being assigned to each. Of the buffer managing information, a pointer (m–next) expresses the position of a buffer where the following chain data is stored, offset (m–off) a relative position where the data is stored, data length (m–len) the length of stored data, and a pointer (m–act) the position of a buffer where the following frame data is stored. A buffer TB01 secures a data storage area in a page buffer TPG0 by means of the offset (m–off). The page buffer TPG0 has a capacity as large as, for example, 4K bytes and is used when a bulk of data is stored. The value of the offset (m–off) may reveal whether the page buffer is being used. Since the offset (m–off) expresses the relative position ranging from the head of a buffer up to a data entry, the page buffer is employed when the value exceeds the length of the buffer, that is, 128.

As shown in FIG. 7, the communication buffer descriptor 300 of the transmitting queue has a collection of descriptors TD00, TD01, TD10 . . . formed with four words, for instance, and is used in the form of a ring. Of the descriptors TD00, TD01, TD10, an address (ADR) represents the head address of a buffer in which transmission data is stored and the data length (BCNT) represents the length of data thus stored. The data length (BCNT) has the same value as that of the data length (m–len) in the protocol buffer. A control flag (DIR) indicates that the descriptor is occupied by the communication controller 4 (DIR=1), the driver 21 or the protocol program 22 (DIR=0).

The driver sets the control flag (DIR) to 1 after filling the area designated by the descriptor with data. The communication controller 4 clears the control flag to zero after transmitting the contents of the buffer. The head flag (ST) and the last flag (EN) are used to represent the head and last buffers of a frame. When ST=1, it represents the initial buffer of the frame, and when EN=1, it represents the last buffer of the frame. In FIG. 7, the descriptor TD00 and the protocol buffers TB00, TD01 and TB01, TD10 and TB10 all indicate the same area of the same transmitting data.

The receiving queue will subsequently be described. The receiving queue 215 is, as shown in FIG. 8, basically similar in structure to the transmitting queue 214 shown in FIG. 7. Size (LEN) in the descriptor indicates the allocated length of the receiving buffer area. When the receiving queue is used to receive data, it is needed to allocate protocol buffers and descriptors for a plurality of frames beforehand. When the communication controller 4 receives a frame, it successively stores data in the areas directed by the descriptor and also sets the length (BCNT) of the data received by the descriptor, the head flag (ST), the last flag (EN) and the control flag (DIR).

The operation of the communication control system will be described.

Figure 2:
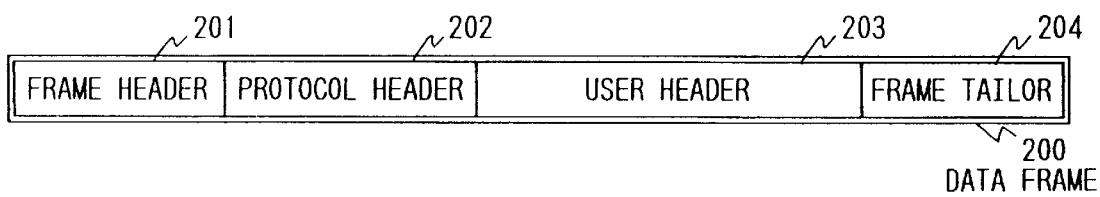
FIG. 2 shows a frame format for use in illustrating processing method according to the present invention.
Figure 3:
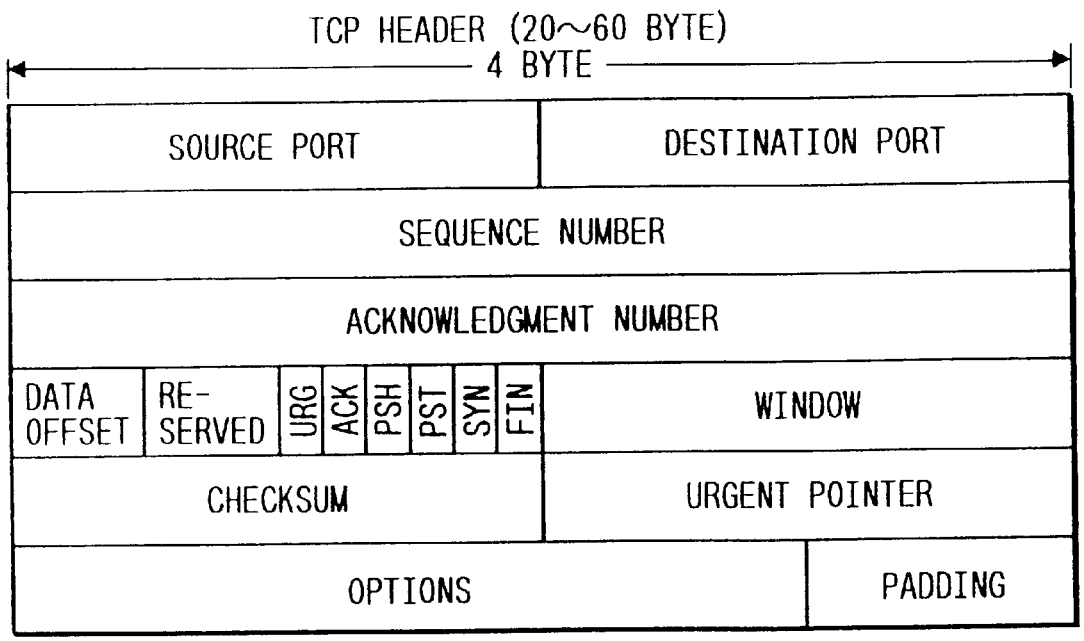
FIG. 3 shows a frame format for use in illustrating processing method according to the present invention.
Figure 4:
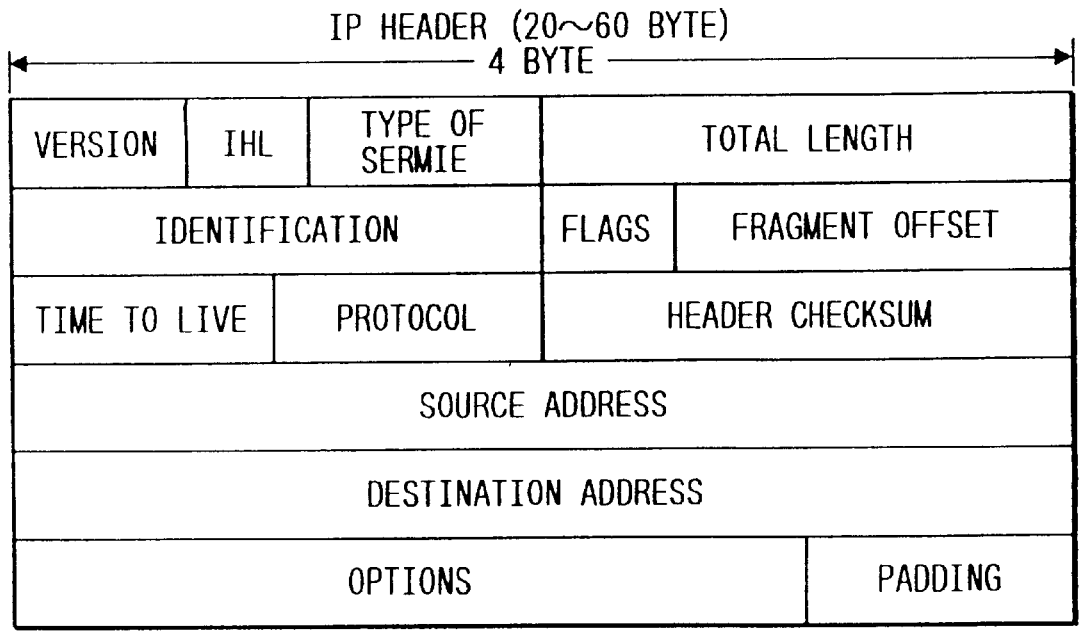
FIG. 4 shows a frame format for use in illustrating processing method according to the present invention.

For the sake of convenience, the communication protocols dealt with in this communication control system are TCP/IP (Transmission Control Protocol/Internet Protocol), and low hierarchical protocols IEEE802. 3, IEEE802.2. The data frame flowing through the transmission line 3 has a format of FIG. 2. In FIG. 2, the data frame 200 comprises a frame header 201, a protocol header 202, a user data 203 and a frame tailor 204. The frame header 201 holds destination address data, and the frame tailor 204 holds check code data for detecting a data error. Of the components of FIG. 2, the frame header 201 is generated by the protocol program 22 of FIG. 1 and decoded by the communication controller 4, whereas the protocol header 202 is both generated and decoded by the protocol program 22. Moreover, the frame tailor 204 is generated and decoded by the communication controller 4. The user data 203 is used by the application program 23 and delivered from the application program 23 to the protocol program 22. IP and TCP of the protocol header 202 are arranged as shown in FIGS. 3 and 4, respectively.

In FIG. 1, the data frame sent from the transmission line 3 is received as follows. A coded frame is decoded by the communication controller 4 before being assembled into byte units. The frame header 201, the protocol header 202 and the user data 203 are written via the bus 8 into the receiving queue (420D) shown in FIG. 8. At this time, the communication controller 4 examines the frame header 201 and receives only a transmission that has been addressed to its own address. Further, the frame tailor 204 checks whether the data is correct or not. When the data frame is received, the interrupt signal 217 for receiving from the communication controller 4 is used to interrupt the processor 1, and the receiving interrupt control module 213 of the driver 21 of FIG. 5 is started.

Figure 9:
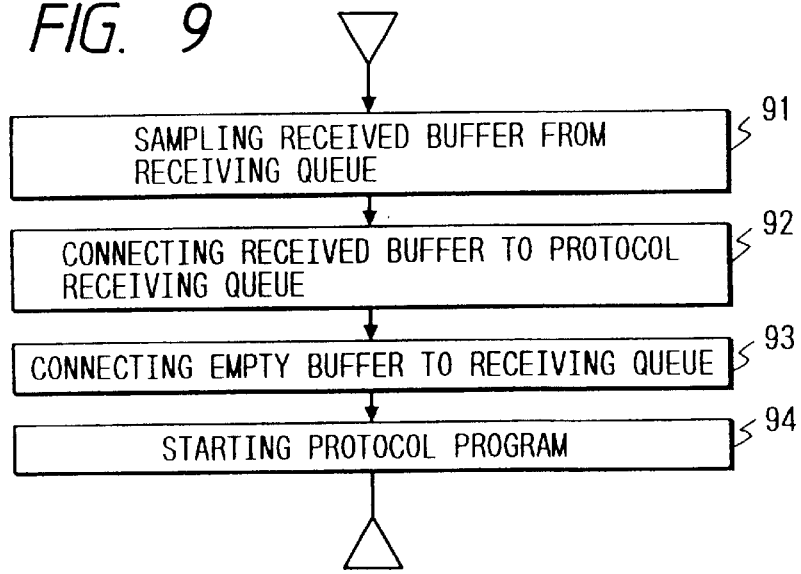
FIG. 9 is a flowchart showing the steps in an interrupt process for receiving.

FIG. 9 is a flowchart illustrating the operation of the receiving interrupt control module 213. At Step 91, the control flag (DIR=0) of the descriptor shown in FIG. 8 is searched to find the protocol buffer for the data that has been received. When the buffer is found, it is removed from the receiving queue 215 at Step 92 and then it is connected to the protocol receiving queue 222 of FIG. 6. The queue can be removed simply by operating the pointer (m–next), (m–act) of the protocol buffer. The structure of the protocol receiving queue 222 shown in FIG. 6 is similar to that of the protocol buffer of FIG. 7 or 8. Consequently, no data is transferred as the buffer containing the data is switched over. Subsequently, an empty buffer is made available by the buffer manager 25, and then it is connected to the receiving queue 215 at Step 93. The descriptor is naturally changed at this time. Lastly, the protocol program 22 is started using, for example, software interruption, at Step 94.

The protocol program 22 operates as follows. First, the data frame is taken out of the protocol receiving queue 222 and the protocol header 202 is processed as shown in FIG. 2. Then the frame header 201 and the protocol header 202 are removed, and only the user data 203 is delivered to the application program 23.

The transmitting operation is performed in reverse order. When data transmission is requested by the application program 23, the protocol program 22 receives the user data from the application program 23, adds the protocol header 202 and the frame header 201 of FIG. 2 and delivers the combination to the transmitting control module 212 of FIG. 5. The buffer used by the protocol program 22 is that managed by the buffer manager 25.

Figure 10:
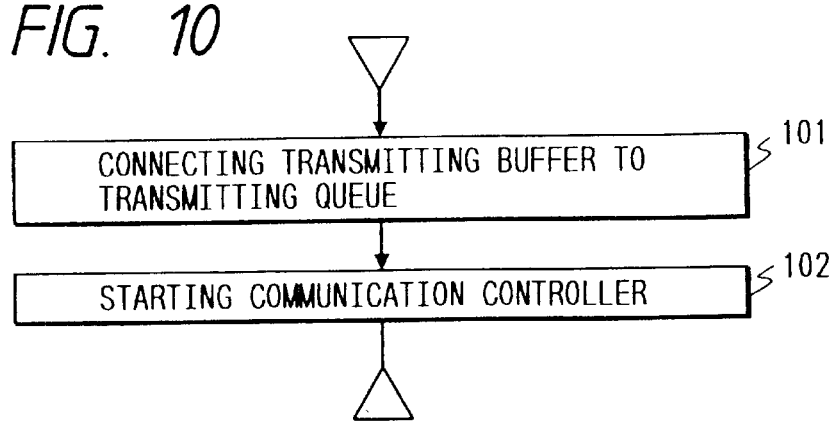
FIG. 10 is a flowchart showing the steps in a transmitting process.

FIG. 10 is a flowchart illustrating the operation of the transmitting control module 212. At Step 101, the buffer received from the protocol program 22 is connected to the rearmost end of the transmitting queue of FIG. 7. A descriptor is naturally prepared then. Subsequently, the communication controller 4 is started at Step 102. Since the communication controller 4 normally sends out the data connected to the transmitting queue to the transmission line 3 in sequence, it is unnecessary to start the communication controller 4 when data frames are continuously transmitted. The Step 102 is provided in consideration of a case where the communication controller 4 remains stationary.

The communication controller 4 takes data frames on standby at the transmitting queue one after another, changes them into bit strings and sends the encoded data frame to the transmission line 3. At this time, the frame tailor of FIG. 2 is added at the end. When the transmitting operation is terminated, the communication controller 4 interrupts the processor 1 by means of the interrupt signal 216 for end of transmitting and the interrupt control module 211 for end of transmitting of the driver 21 of FIG. 5 is started.

Figure 11:
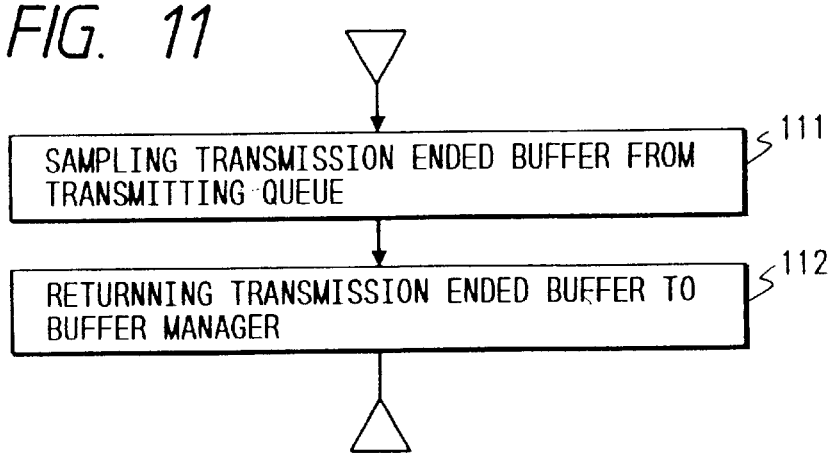
FIG. 11 is a flowchart showing the steps in an interrupt process for end of transmitting.

FIG. 11 is a flowchart illustrating the operation of the interrupt control module 211 for end of transmitting. At Step 111, the control flag (DIR=0) of the descriptor of FIG. 9 is searched to find the protocol buffer that has terminated the transmitting operation. When this buffer is found, it is removed from the queue and returned to the buffer manager 25 at Step 112.

Referring to FIGS. 16–21, a description will subsequently be given of another method of controlling the shared-buffer 218 having the communication buffer descriptor and the protocol buffer shown in FIGS. 7 and 8.

FIG. 17 is a conversion table for the communication protocol buffers for transmitting 1701 for defining the relation between the communication buffer descriptor and the protocol buffer. As shown in FIG. 16, the conversion table of the communication protocol buffers for transmitting 1701 is connected to the transmitting control module 212.

Each line number in the conversion table of the communication protocol buffers for transmitting 1701 of FIG. 17 corresponds to a descriptor number TD00, TD01 . . . in the communication buffer descriptor shown in FIG. 7. The chain flag shows the head of a chain (ST=1) or the end (EN=1).

The address (virtual address) of the protocol buffer corresponding to the descriptor and the data address (including virtual and real addresses) in the protocol buffer are stored in the respective items.

The virtual address refers to what is accessed by the virtual storage method and used in general programs.

The real address refers to what is attached to the memory physically and is used by the communication controller as an address of the system memory when the exchange of data is effected between the transmission line and the system memory under DMA (Direct Memory Access).

At the time of transmitting, the communication controller 4 searches the descriptor within the communication buffer descriptor in the system memory 2 and sends out transmitting data with the address of the transmitting buffer registered therein to the transmission line. Since the address dealt with by the communication controller 4 is an actual one, the address of the transmit-receive data registered in the descriptor has to be an actual one. On the other hand, the protocol program 22 and the driver 21 use the virtual address of the protocol buffer to access the transmitting data. Therefore, there arises the necessity of providing a conversion table for use in converting the virtual address of the transmitting data to an actual of this data.

Figure 20:
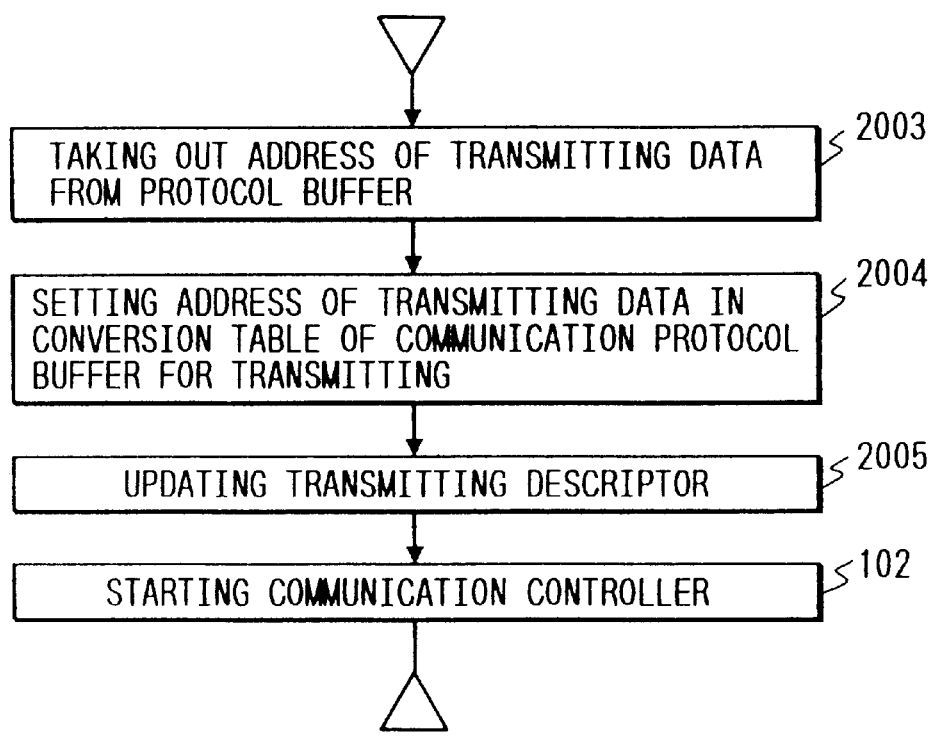
FIG. 20 is a flowchart showing the steps in an interrupt process for receiving data in accordance with the present invention.

FIG. 20 is a flowchart illustrating the operation of transmitting control module 212 shown in FIG. 16. At Step 2003, the head address (virtual address) of a buffer and that (virtual address) of data received from the protocol program 22 are obtained so as to set a value in the conversion table of the communication protocol buffers for transmitting 1701 corresponding to the number of the transmitting descriptor.

Referring to FIGS. 7 and 17, the virtual addresses T×D00, TPG0, T×D10 of the transmitting data are obtained from the protocol buffers TB00, TB01, Ts10 with respect to the descriptors TD00, TD01, TD10 and, after they are converted to real addresses R_T×D00, R_TPG0, R T×D10, the data are stored in respective line positions corresponding to the respective descriptor numbers (1904). Then, the updating of the descriptor is based on the conversion table of the communication protocol buffers for transmitting 1701 (2005) and the communication controller is started (102).

Figure 19:
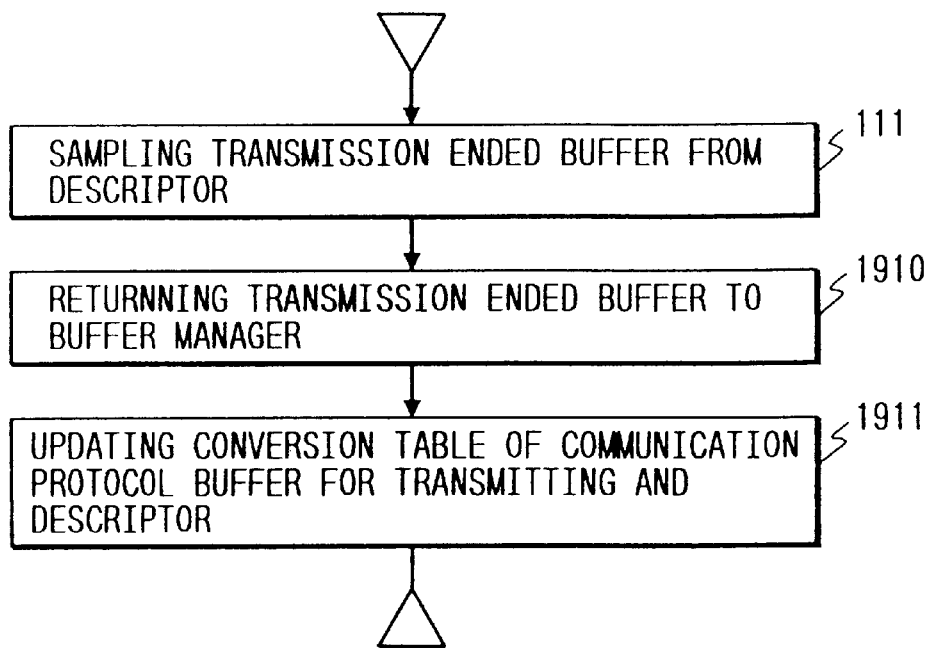
FIG. 19 is a flowchart showing the steps in an interrupt process for end of transmitting in the driver shown in FIG. 16.

FIG. 19 is a flowchart illustrating the operation of the interrupt control module 211 for end of transmitting shown in FIG. 16. The interrupt control module 211 for end of transmitting samples the transmission ended buffer from the descriptor of FIG. 7 (111), obtains the address (virtual address) of the protocol buffer from the descriptor having the corresponding number by means of the conversion table of the communication protocol buffers for transmitting 1701 and returns the address thus obtained to the buffer manager 25 (1910). This process is terminated when the conversion table of the communication protocol buffers for transmitting 1701 and the descriptor are updated (1911).

FIG. 18 is a conversion table of the communication protocol buffers for receiving 1801 for defining the relation between the communication buffer descriptor and the protocol buffer. The conversion table of the communication protocol buffers for receiving 1801 is connected to the receiving control module 213 as shown in FIG. 16 and is provided with items similar to those of the conversion table of the communication protocol buffers for transmitting 1701.

Figure 21:
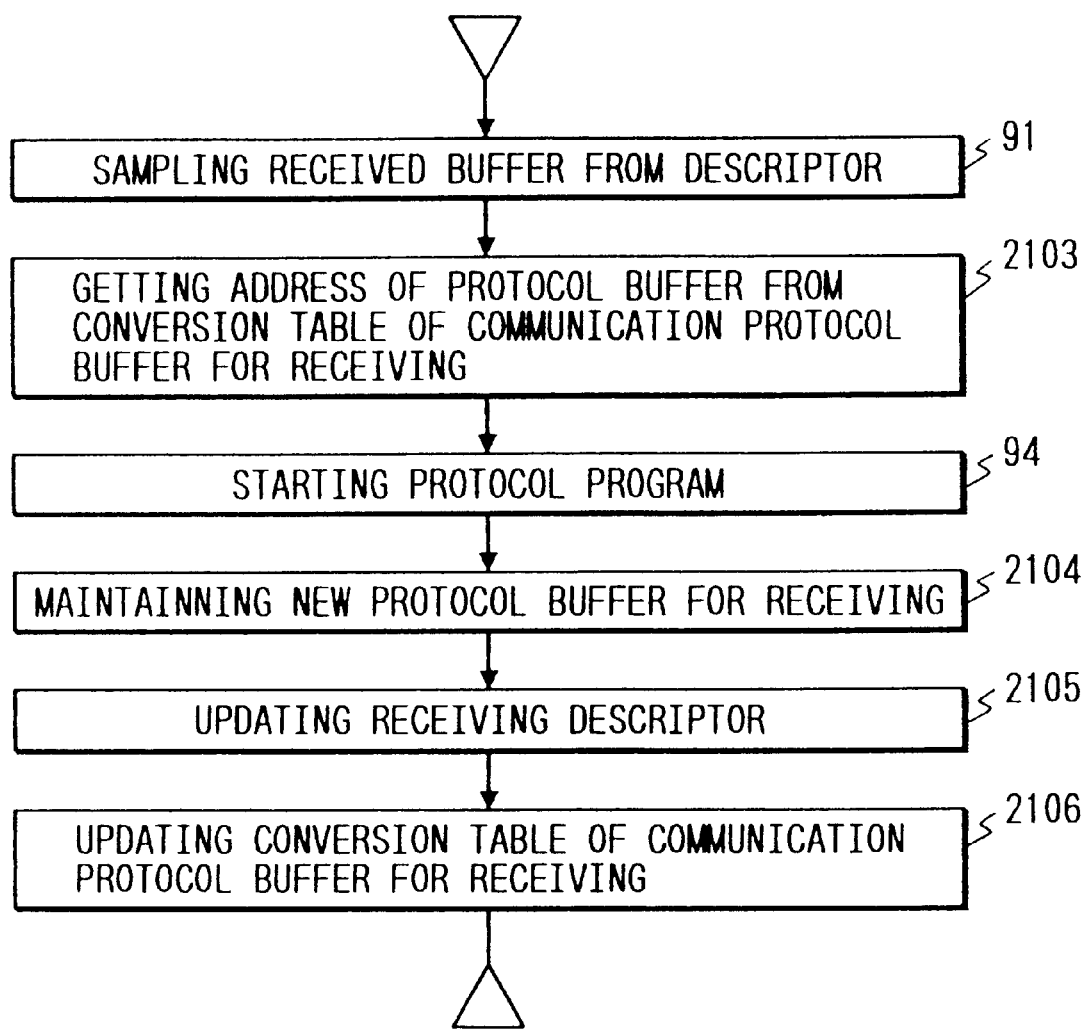
FIG. 21 is a flowchart showing the steps in another interrupt process for receiving data in accordance with the present invention.

FIG. 21 is a flowchart illustrating the operation of the receiving interrupt control module 213 shown in FIG. 16. The receiving interrupt control module 213 started by the interrupt signal 217 for receiving samples the buffer identified by the indication received from the descriptor shown in FIG. 8 and obtains the address of the protocol buffer (virtual address) from the conversion table of communication protocol buffers for receiving 1801 (2102). Subsequently, the receiving interrupt control module 213 registers the protocol buffer in the receiving queue in the protocol program 22 and starts the protocol program 22 (94). Then, the receiving interrupt control module 213 secures a new receiving protocol buffer from the buffer manager 25 shown in FIG. 1 (2104) and updates the receiving descriptor (2105). This receiving interrupt control process is terminated when the address (virtual address) of the protocol buffer and the addresses (virtual and real addresses) of the data are registered in the conversion table of the communication protocol buffers for receiving 1801.

Figure 22:
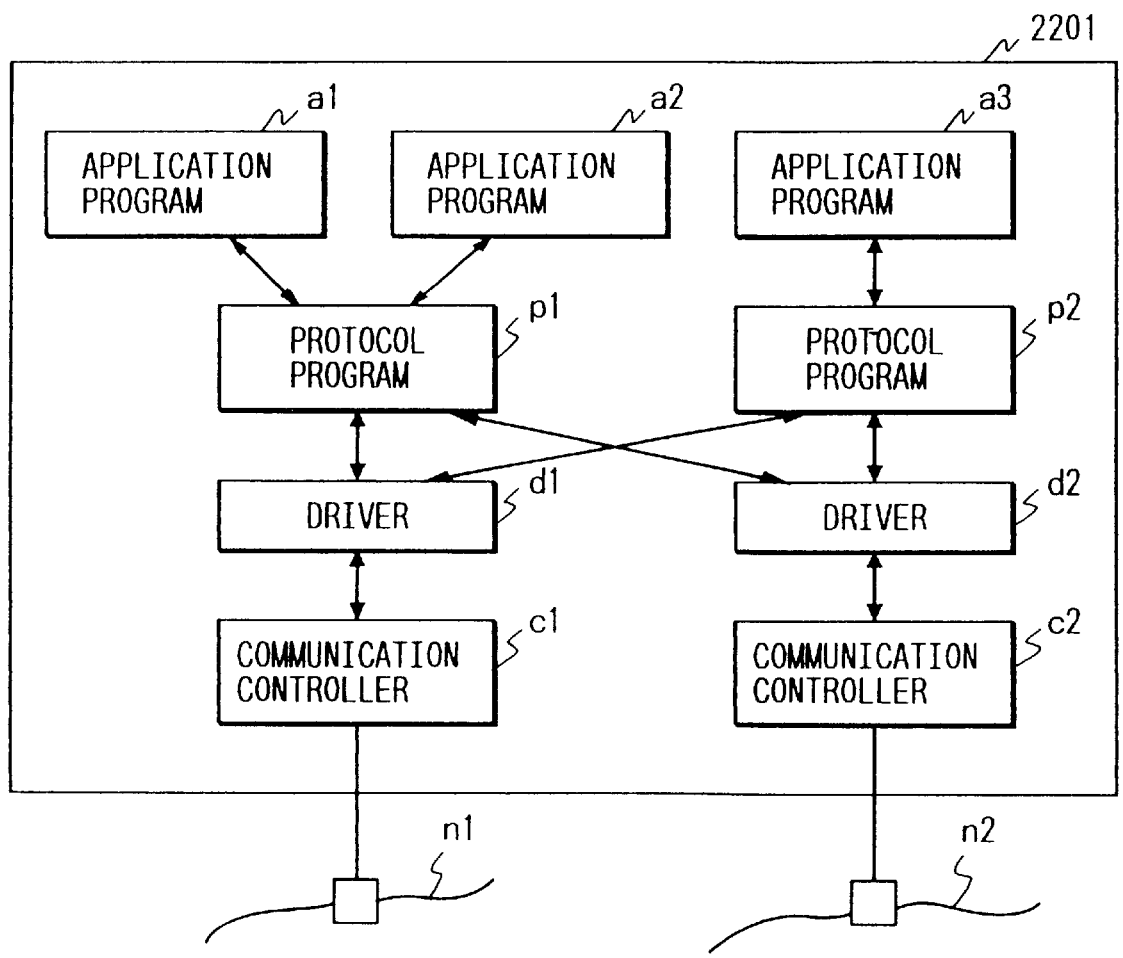
FIG. 22 is a block diagram of a communication control system in accordance with the present invention.

FIG. 22 is a block diagram of another communication control system embodying the present invention. Although one communication controller, one communication protocol and one application program have been shown for use in FIG. 1, an exemplary communication control system 2201 in FIG. 22 comprises two communication controllers c1, c2, two drivers d1, d2, two protocol programs p1, p2 and three application programs a1, a2, a3. The communication control system shown in FIG. 22 is also provided with the system processor 1, the bus 8 and the like; however, the description of these elements will be omitted as they function in the same manner as previously described.

Figure 25:
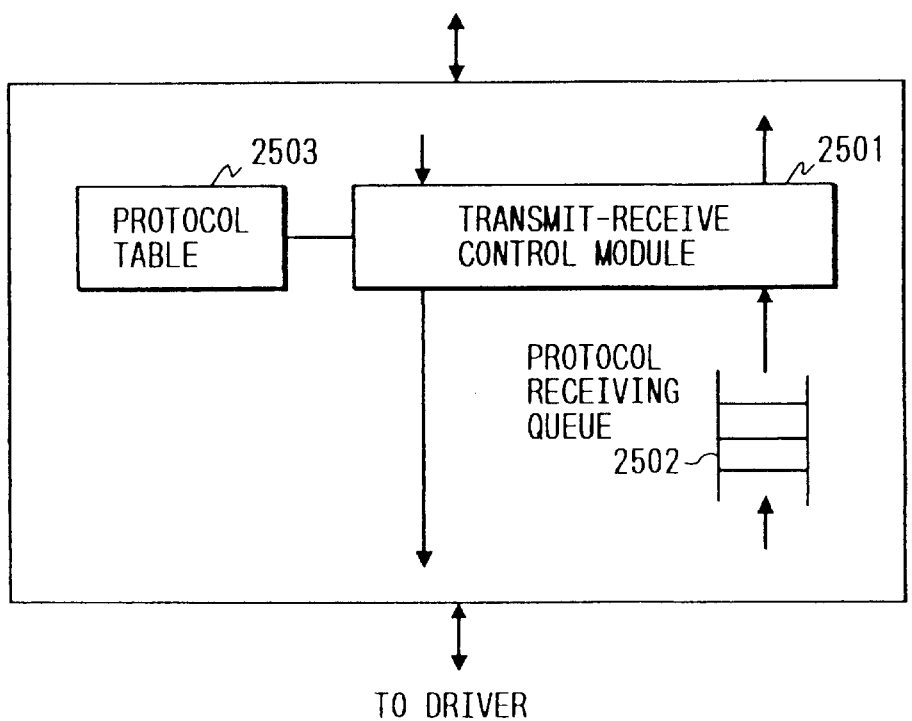
FIG. 25 is a block diagram illustrating the internal structure of a protocol program in the system of FIG. 22.

The communication controllers c1, c2 transmit and receive data while controlling respective transmission lines n1, n2. These communication controllers are similar to what is shown in FIG. 1 and may be either of the intelligent or the nonintelligent types shown in FIGS. 12 and 14. The drivers d1, d2 control the respective communication controllers d1, c2 and mediates exchange of data between the protocol programs p1, p2. The protocol programs p1, p2 have the same internal structure, and, as shown in FIG. 25, each comprises a transmit-receive control module 2501, a protocol table and a protocol receiving queue 2502.

Figure 24:
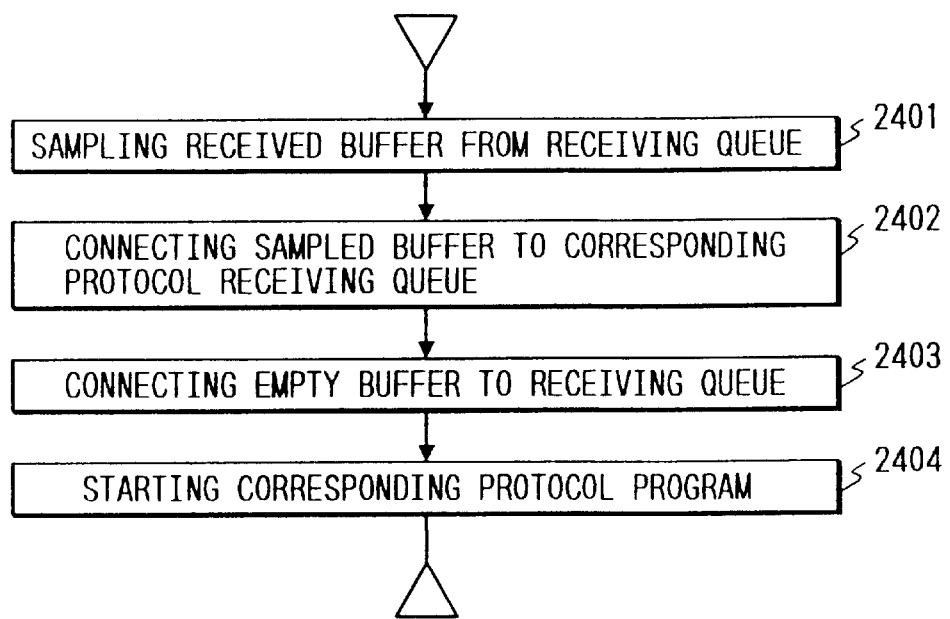
FIG. 24 is a flowchart showing the steps in an interrupt process for receiving data in the system of FIG. 22.

First, the drivers d1, d2 will be described. The internal structure of the drivers d1, d2 is the same as what is shown in FIG. 5, except for the operation of the receiving interrupt control module 213. FIG. 24 shows a flowchart illustrating the operation of the receiving interrupt control module 213, wherein steps, excluding Steps 2402 and 2404, are similar to those shown in the operating flowchart of FIG. 9. At Step 2401, the protocol buffer having the data frame received is sampled from the receiving queue 215. The protocol buffer is provided with the frame header 201, the protocol header 202 and the user data 203 of those ports of the data frame shown in FIG. 1. At Step 2302, the frame header 201 of the data frame is examined to determine the kind of the protocol.

Figure 23:
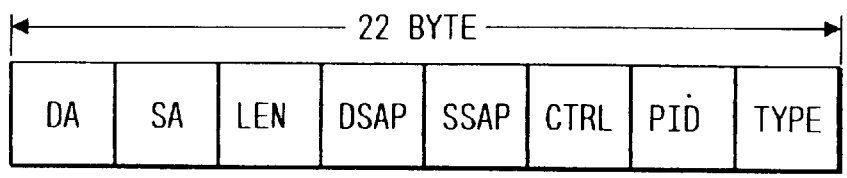
FIG. 23 is a frame header format for use in illustrating a processing method in the system of FIG. 22.

FIG. 23 shows a format of an IEEE802.3, IEEE802.2 SNAP (Sub Network Access Protocol) frame header. The "TYPE" field in the frame header forms a protocol identifier, for example, TYPE=2048 designating TCP/IP and TYPE=2054 ARP (Address Resolution Protocol). At Step 2402, the protocol is identified and subsequently the protocol buffer is connected to a protocol receiving queue 2502 in the corresponding protocol program. At this time, no data is transferred as the buffer containing the data is switched over. Further, an empty buffer is connected to the receiving queue 215 of FIG. 5 at Step 2403, and software interruption, for example, is used to start the corresponding protocol program p1 or p2 shown in FIG. 22 at Step 2404.

The receiving operation with the protocol program p1 or p2 will be described. The transmit-receive module control 2501 takes the data frame out of the protocol receiving queue 2502, performs the process with respect to the protocol header 202 shown in FIG. 2, removes the frame header 201 and the protocol header 202, and then delivers only the user data 203 to one of the application programs a1, a2, a3 shown in FIG. 22.

Figures 26, 27:
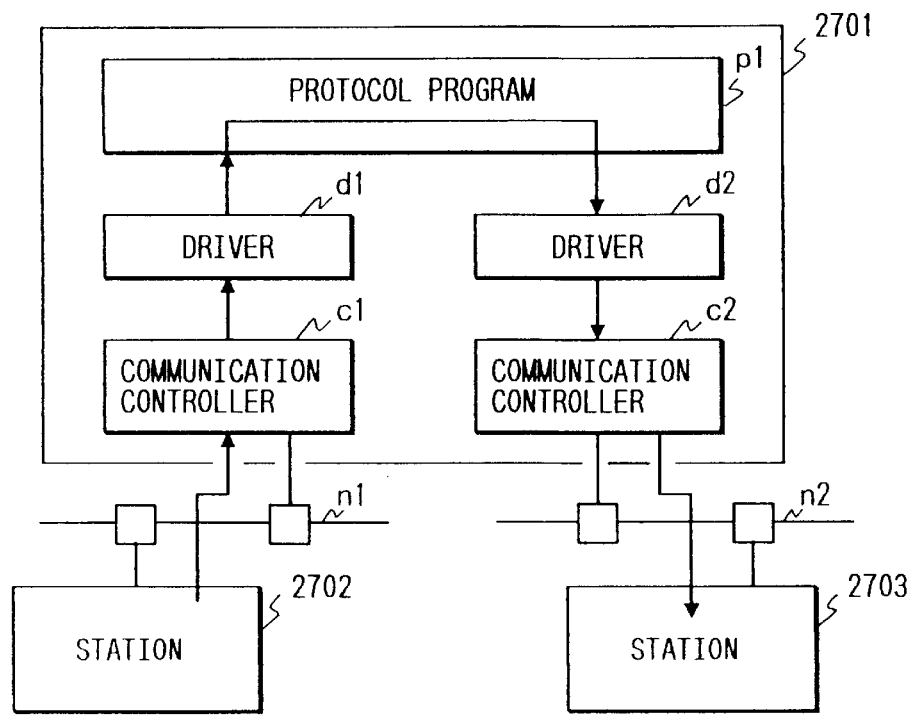
FIG. 26 is a block diagram illustrating the internal structure of a protocol table in the system of FIG. 22.
FIG. 27 is a block diagram of a router using the communication control system of FIG. 22.

A protocol table 2503 shown in FIG. 25 is used to select the application program. The contents shown in FIG. 26 are registered in the protocol table 2503 beforehand. An address refers to a number of a communication window fitted to the system; that is, in the case of receiving, it means "Source Address," "Destination Address." A port number refers to a number of a communication window attached to an application program; that is, in the case of receiving, it means "Source Port," "Destination Port." The addresses, the port numbers, the application program identifier, and a driver identifier corresponding one-to-one to the transmission line to which the destination station has been connected are registered as a set. In order to actually select a corresponding application program from the data frame received, "Destination PortH is sampled out of the protocol header first and the corresponding application program identifier is obtained by means of the protocol table of FIG. 26.

The transmitting operation with the protocol program p1 or p2 will be described. When a request is made to transmit data from one of the application programs a1, a2, a3 shown in FIG. 22, the protocol program p1 or p2 receives user data from the application program at the transmit-receive control module 2501, adds the protocol header 202 and the frame header 201 shown in FIG. 2 thereto, and delivers the combination to either driver d1 or d2 shown in FIG. 22. The protocol table shown in FIG. 25 is used to select the driver. Since the transmission line to which the destination application program has been connected, that is, the driver identifier corresponding to the source port number, has been registered in the protocol table 2503, as shown in FIG. 26, the one of the drivers to be used is determined from this driver identifier.

FIG. 27 illustrates a router using the communication control system of FIG. 22 according to the present invention. The component elements of a communication control system 2701 are similar to those shown in FIG. 22 and like reference characters are given to like and corresponding elements. A station 2702 is connected to the transmission line ni and a station 2703 to the transmission line n2. FIG. 27 illustrates a case where data is transmitted from the station 2702 on the transmission line n1 via the communication control system 2701 to the station 2703 on a different transmission line n2. Data from the station 2702 is passed through the transmission line n1 and the communication controller c1 before being supplied to the shared-buffer in the driver d1 without being buffered halfway in real time. The protocol program p1 switches the protocol header for the frame header with respect to the data frame in this buffer and connects the buffer to the shared-buffer in the driver d2. The data thus replaced in the shared-buffer is passed through the communication controller c2 and the transmission line n2 before being delivered to the station 2703 in real time. As one and the same buffer is used among the driver d1, the protocol program p1 and the driver d2, no useless buffer-to-buffer movement of data is performed.

What is claimed is:
1. A communication control system comprising:
    a system processor which processes communication data according to a higher level communication protocol;
    a system memory which stores programs executed by said system processor and data processed by said system processor;
    a communication controller, coupled to a transmission line and to said system memory, which transmits and receives a frame including said communication data on said transmission line while controlling said transmission line and processing said frame according to a lower level communication protocol; and
    a shared-buffer which stores said communication data, said shared-buffer being shared by said system processor and said communication controller,
    wherein said system processor reads out and writes in said communication data from and to said shared buffer according to a first buffer descriptor for managing said shared-buffer, and
    wherein said communication controller transfers said communication data between said shared-buffer and said transmission line according to a second buffer descriptor for managing said shared-buffer.
2. A communication control system according to claim 1, wherein said shared memory is provided in said system memory.
3. A communication control system according to claim 2, wherein said system processor sets an address of said shared-buffer into said second buffer descriptor.
4. A communication control system according to claim 1, wherein said communication controller notifies said system processor of an end of a communication data transfer between said communication controller and said transmission line in response to a completion of said data transfer.
5. A communication control system according to claim 1, wherein said system processor accesses said shared-buffer using a virtual address of said shared-buffer and converts said virtual address of said shared-buffer into a real address of said shared-buffer, and
    wherein said communication controller accesses said shared-buffer using said real address of said shared-buffer converted by said system processor.
6. A communication control system according to claim 5, wherein said processor sets said real address of said shared-buffer into said second buffer descriptor.
7. A communication control system according to claim 1, wherein said communication controller include a DMA function and transfers said communication data between said shared-buffer and said transmission line using said DMA function.
8. A communication control system according to claim 1, wherein said higher level communication protocol is the third layer of an OSI reference model.
9. A communication control system according to claim 8, wherein said third layer of the OSI reference model is TCP/IP.
10. A communication control system according to claim 1, wherein said lower level communication protocol is the second layer of an OSI reference model.
11. A communication control system according to claim 10, wherein said second layer of the OSI reference mode is IEEE 802.3.

* * * * *